(12) United States Patent
Santinelli

(10) Patent No.: US 10,254,561 B1
(45) Date of Patent: Apr. 9, 2019

(54) RIMLESS EYE WEAR

(71) Applicant: Joseph Santinelli, Plainview, NY (US)

(72) Inventor: Joseph Santinelli, Plainview, NY (US)

(*) Notice: Subject to any disclaimer, the term of this patent is extended or adjusted under 35 U.S.C. 154(b) by 0 days.

(21) Appl. No.: 16/026,004

(22) Filed: Jul. 2, 2018

Related U.S. Application Data

(63) Continuation-in-part of application No. 15/391,767, filed on Dec. 27, 2016, now Pat. No. 10,012,846.

(60) Provisional application No. 62/387,620, filed on Dec. 28, 2015.

(51) Int. Cl.
G02C 1/04 (2006.01)
G02C 1/00 (2006.01)
G02C 5/10 (2006.01)

(52) U.S. Cl.
CPC .............. G02C 1/04 (2013.01); G02C 1/10 (2013.01); G02C 5/10 (2013.01); G02C 2200/16 (2013.01)

(58) Field of Classification Search
CPC ... G02C 5/02; G02C 1/04; G02C 1/06; G02C 2200/08; G02C 5/16
USPC .................. 351/106, 103, 83, 86, 90, 92
See application file for complete search history.

(56) References Cited

U.S. PATENT DOCUMENTS

| 2,384,867 A | 5/1942 | Williams |
| 4,427,271 A | 1/1984 | Fogg |
| 5,523,805 A * | 6/1996 | Kuipers .................. G02C 1/02 351/103 |
| 6,666,554 B2 | 12/2003 | Mulvey |
| 2007/0216855 A1 | 9/2007 | Tabacchi |

* cited by examiner

Primary Examiner — Hung X Dang
(74) Attorney, Agent, or Firm — Law Office of Carl Giordano, PC

(57) ABSTRACT

A simplified rimless or semi-frame eyewear is disclosed. The eyewear comprises a frame and a pair of lenses that slide into or engage a slotted connection in the frame. The lenses are held in place in a corresponding frame with a retainer.

15 Claims, 13 Drawing Sheets

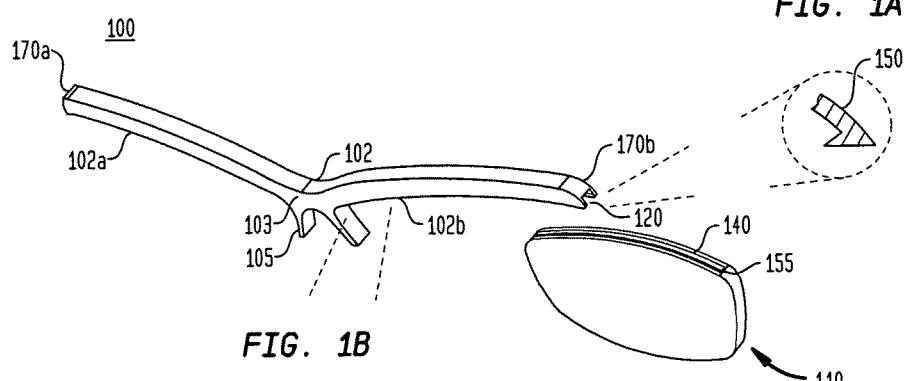
FIG. 1
FIG. 1A
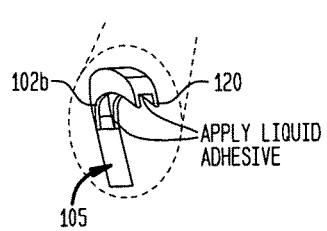
FIG. 1B
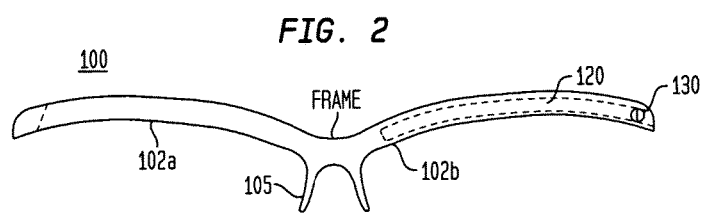
FIG. 2

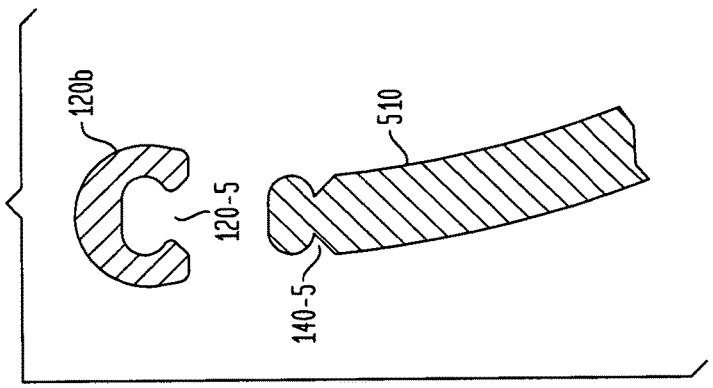
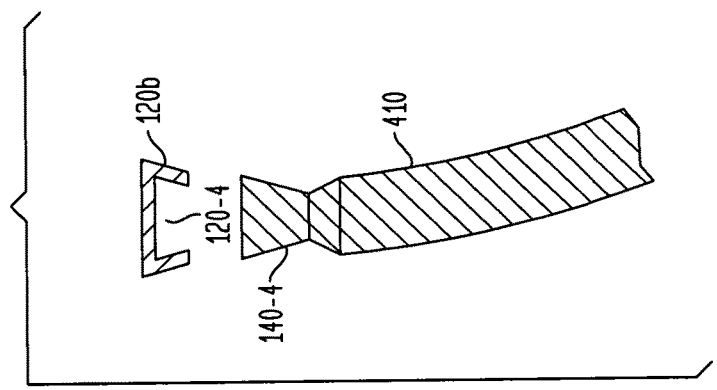
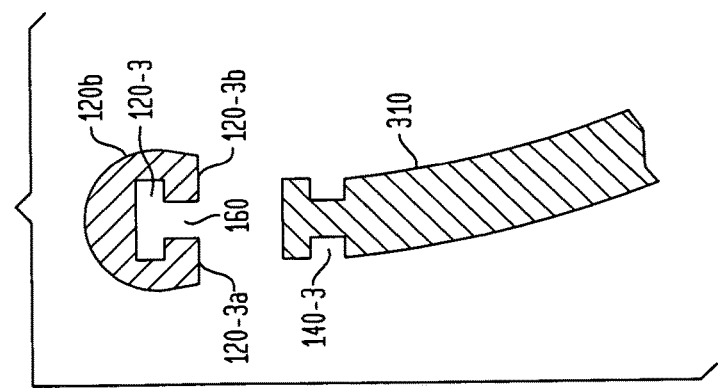

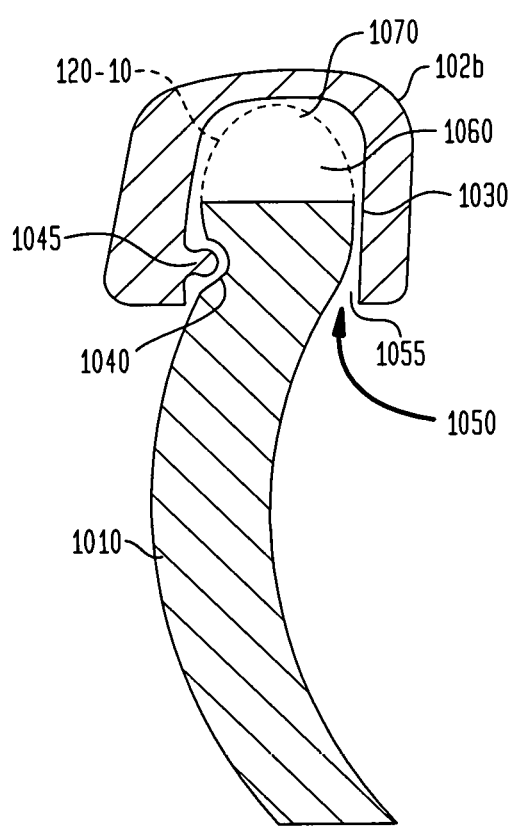

RIMLESS EYE WEAR

CLAIM OF PRIORITY

This application claims priority to, and the benefit of the earlier filing date of that patent application afforded Ser. No. 15/391,767, filed on Dec. 27, 2016 (now U.S. Pat. No. 1,012,846, issued Jul. 3, 2018, which priority to Provisional patent application Ser. No. 62/387,620, filed on Dec. 28, 2015, the content of all of which is incorporated by reference herein.

FIELD OF THE INVENTION

The application relates to the field of eyewear/eyeglasses and specifically with regard to a rimless eye wear.

BACKGROUND OF THE INVENTION

Eyewear is a multi-million dollar industry that continues to generate new designs suitable to combine fashionable statement with functional practicality. Numerous types of eyewear are currently available. Full frame glasses, for example, surround the lens to hold the lens in place, and provide the greatest stability for holding the lens.

Fashion designers have a continued desire to reduce the visual appearance of the eyewear on the user. One of the existing rimless designs in use today is the nylon rimless, semi-frame eyewear, wherein a lens is held into a top portion of a flexible material frame by a nylon string inserted in a bottom groove of the lens. However, there many issues involved is this type of design. For example, it is known that a lens may pop out and without the required machines it is extremely difficult to re-insert the lens. Another issue is that undue pressure on the lens causes aberration and loss of vision. This prevents a user's use of expensive nylon rimless eyewear in many situations.

Another rimless eyewear today is referred to as a three-piece drilled mount rimless concept. However, all optical practitioners are aware of the limitations of this type of lens that present endless issues. For example, drilled lenses compromise the infrastructure of the lenses, and applying pressure such as stress and distortion on the lenses distort the optical properties that impedes the patient's vision.

Another related issue arises when screws inserted in the lens cause cracks in the lenses in everyday use. Lastly, the screws may loosen causing lens to fall out.

In conclusion, the manufacture of present day semi-frame rimless eyewear is expensive and there are a number of known problems with this type of eye wear.

Thus, there is a need to avoid the many negative issues arising from conventional rimless eyewear construction and there is a need for an eyewear that will lower cost to dispense in a practical way and offer quality good looking rimless eyewear to the general public.

SUMMARY OF THE INVENTION

It is therefore an objective of the present invention to provide semi-frame eyewear and a method of manufacturing semi-frame eyewear in a simpler manner. The present invention refers to a semi-frame eyewear comprising a frame and a pair of lens that slide into or engage a slotted connection in the frame. In accordance with the principles of the invention, the lens simply slides into the corresponding frame and is held in place with a locking design. An example of a locking mechanism is a screw connector may be incorporated into the frame that engages the lens and locks the lens in place.

In one aspect of the invention, the lens may be formed or machined to contain an extension member that engages a corresponding containing member within the frame. In one aspect of the invention, the formation (i.e., extension member, engagement member) in the lens may, for example, be one of a dovetail, a T-slot, a groove, a protrusion and an O-ring whereas the frame may include an opposing slotted connection in a corresponding form (e.g., a dovetail, a T-slot, a protrusion, a groove, an O-ring). In another aspect of the invention, the slot within the frame may include a soft material, e.g., a rubber, silicon or polymer, that may provide a means to facilitate the engagement of the extension member within the slot and further compensate for any tolerance errors in the formation of the slot or the lens extension member. In one aspect of the invention, the use of a silicon material is advantageous as it is initially liquefied (or semi-liquified) and malleable and hardens when dry.

In another aspect of the invention, the material may be a heat sensitive material, which may be malleable (i.e., adaptable) when heated and then stiffened or hardened when cooled. With the incorporation of a malleable material, a lens may be inserted into the frame when the material is heated and then retained in place when the material cools. In another aspect of the invention, the lens may be held within the slotted frame by the application of an adhesive (e.g., a liquid, heat activated, etc.) within the slot. In another aspect of the invention, the extension member of the lens may have a snap-in (or a snap-fit) connection to a corresponding slot in the frame, wherein the lens is held in place by the friction between the lens and the frame. In still another aspect, the lens may have a single groove in one side of the lens. The single groove may engage a matching protrusion within the frame. The second side of the lens, which is not machined, may then be slide into the frame slot and held in place, as previously disclosed with a heat-sensitive material (e.g., a polymer) and/or an adhesive (i.e., liquid, heat-activated). Alternatively, the lens may have a protrusion formed on a first side of the lens and the frame may have a matching groove, wherein after inserting the protrusion into the groove in the frame, the second side of the lens may then be slide into the frame slot and held in place with a heat sensitive material and/or an adhesive.

In another aspect of the invention, an eyewear comprising a frame including a left section and a right section, wherein a first end of each of the left section and the right section are connected to a bridge section is disclosed. Within each of the left section and the right section is a slot or channel into which a corresponding lens may be placed. Within a top section of each slot or channel in a corresponding left section and right section is a second channel or slot extends from substantially an open end to the bridge section into which a step-bevel along a top of a corresponding lens may be inserted. Each of the corresponding lens further incorporates a deformation (or groove) along a surface of the lens. The deformation may engage a retainer within a corresponding frame section to retain a lens within the corresponding slot or channel.

In one aspect of the invention, the retaining means may represent a protrusion only an edge of a surface of a slot and the deformation may represent a groove within a corresponding lens. In another aspect of the invention, the retaining means may represent a nylon band tightly extending from an open end of a corresponding slot to the bridge section and the deformation may represent a groove within a corresponding lens. Engagement of the nylon band within the groove provides sufficient pressure on the lens to retain the lens within the corresponding slot.

BRIEF DESCRIPTION OF THE DRAWINGS

For a better understanding of exemplary embodiments and to show how the same may be carried into effect, reference is made to the accompanying drawings. It is stressed that the particulars shown are by way of example only and for purposes of illustrative discussion of the preferred embodiments of the present disclosure, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice and the drawings are not drawn to scale. In the accompanying drawings:

FIG. 1 illustrates perspective exploded rimless eyewear in accordance with the principles of the invention.

FIG. 1A illustrates an exploded view of an end of the eyewear shown in FIG. 1.

FIG. 1B illustrates an exploded view of a bridge element of the eyewear shown in FIG. 1.

FIG. 2 illustrates a front view of the eyewear shown in FIG. 1.

FIG. 3 illustrates a cross-sectional view of exemplary eyewear configuration in accordance with the principles of the invention.

FIG. 4 illustrates a cross-sectional view of an exemplary eyewear configuration in accordance with the principles of the invention.

FIG. 5 illustrates a cross-sectional view of an exemplary eyewear configuration in accordance with the principles of the invention.

FIG. 10 illustrates a cross-sectional view of an exemplary eyewear configuration having a tongue/groove connection in accordance with the principles of the invention.

Figure 6:
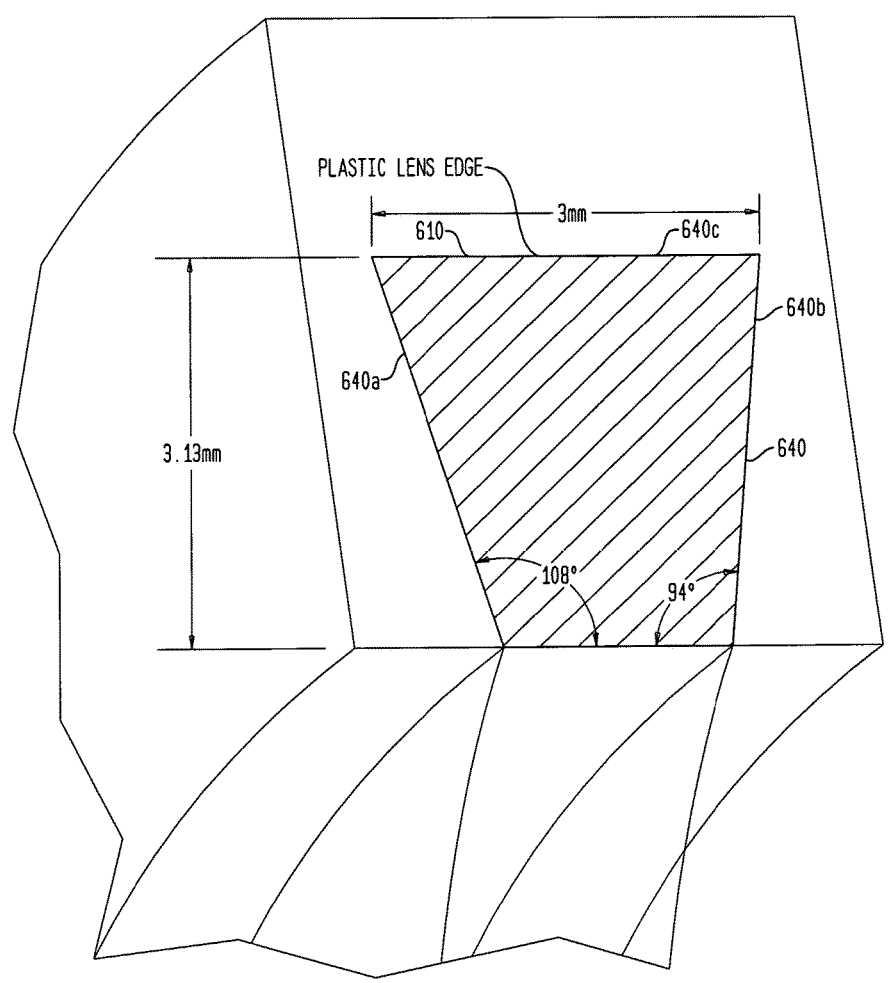
FIG. 6 illustrates a cross-sectional view of an exemplary configuration of the dovetail configuration shown in FIG. 4 in accordance with the principles of the invention.

It is noted that the drawings of the invention are not to scale. The drawings are intended to depict only typical aspects of the invention, and therefore should not be considered as limiting the scope of the invention. In the drawings, like numbering represents similar or like elements between the drawings.

It is to be understood that the figures and descriptions of the present invention described herein have been simplified to illustrate the elements that are relevant for a clear understanding of the present invention, while eliminating, for purposes of clarity, many other elements. However, because these elements are well-known in the art, and because they do not facilitate a better understanding of the present invention, a discussion of such element is not provided herein. The disclosure herein is directed also to variations and modifications known to those skilled in the art.

DETAILED DESCRIPTION OF THE PRESENT INVENTION

FIG. 1 illustrates an exploded perspective of eyewear 100 in accordance with the principles of the invention wherein the eyewear 100 comprises a frame 102, composed of a left side 102a and a right side 102b, joined together by a bridge element 103. Although not shown it would be known in the art that the eyewear generally includes temples (i.e., a term of art) that extend from the frame 102 to engage a user's ears so as to retain the eyewear 100 on the user. It would be recognized that the materials utilized for frame construction may be of a plastic, a composite material, a metal material and/or combinations of these materials. The composition of the plastic and/or composites and/or metals utilized for frame construction is similarly well-known in the art and need not be discussed in detail herein.

Further shown is slot 120 shown at an end of the right side 102b. Slot 120 will be discussed in more detail.

Further shown is lens 110 situated to engage the right side 102b of frame 102. Although only a single lens is shown, it would be recognized that the eyewear is composed of two lenses. It would be further recognized that the lens may be constructed from a plastic material and/or a glass material. The composition of the plastics and/or glass material for the construction of the lens 110 is well-known in the art and need not be discussed in detail herein. In one aspect the lenses may be constructed to have a fixed magnification (i.e., reading glasses with magnifications such as 1.25, 1.5, 1.75 etc.). Alternatively, the lens may be medically required, prescriptive, lens, which are custom manufactured for a client.

Further shown is an extension or engagement means 140 along a top edge of the lens 110. Engagement means 140 engages slot 120 to retain lens 110 to frame 102, as will be discussed.

FIG. 1A discloses an exploded view of an end of the right side 102b of the frame 102, which illustrates an edge connection 150 (i.e., a clip) at a free end 170b that locks lens 110 into frame 102 after the lens has been placed within the slot. The edge connection 150 may be connected within slot 120 by a hinge connection (not shown), which when the clip is placed in an up position, lens 110 may slide into slot 120.

Whereas when the clip 150 is placed in a down position, the clip 150 engages an edge 155 of engagement means 140 or an edge of lens 110 to retain lens 110 within slot 120.

FIG. 1B illustrates a exploded view of an internal surface of the nose element 105 of right side 102b showing slot 120 extending from the free outer edge of the right side 102b of frame 102 to nose element 105. The engagement of lens 110, when desired, with the portion of the slot in nose element 105 provides for stability of the lens within frame 102. Further shown is an adhesive that may be included in slot 120 to provide for greater retention and stability of lens 110 within slot 120, as will be discussed.

In one aspect of the invention, slot 120 extends substantially from a free (outer) end 170a, 170b of a corresponding left section 102a and right section 102b of frame 102 to the bridge section 103. In a further aspect of the invention, the slot 120 may extend substantially from the free end 170a, 170b of a corresponding left section 102a and right section 102b to substantially the nose element 105. Furthermore, the engagement element 140 which extends along a top portion of lens 110, may engage all, or a limited portion, of a corresponding slot 120 in left section 102a and right section 102b. That is, the insertable engagement means 140 may in one aspect of the invention, extend substantially to the bridge section from substantially near the free end (170a, 170b) of the corresponding section. Alternatively, the insertable engagement means 140 may extend to the nose element 105 from the free end of the corresponding section or substantially near the free end of the corresponding section.

FIG. 2 illustrates a front view of frame 102 showing slot 120, in hidden view lines, within right side 102b. It would be recognized that a similar slot is contained in left side 102a.

Further shown is a screw 130, which may be included in an end of the frame 102. Screw 130 may be used to retain lens 110 (not shown) in frame 102 after lens 110 is slide or placed within slot 120.

Although a single screw is show located on a front surface of the frame near the temple, it would be recognized that the one or more screws may be incorporated into the frame at different locations on the frame. For example, a screw may be incorporated along a top of the frame 102 or may be incorporated in a back surface of frame 102. Furthermore the one or more screws may be located near the bridge, near the free end and/or distributed along the frame.

FIG. 3 illustrates an end view of a first exemplary embodiment of a frame and lens in accordance with the principles of the invention.

In this illustrated embodiment, the slot 120 (referred to as 120-3) within frame 102b is represented as a T-slot connection. T-slot connections are well known in the art and receive their name, generally, based on the matching engaging connection; in this case engagement connection 140-3, formed in lens 310, which has a shape of a "T." As shown, the slot 120-3 is formed with two protrusions 120-3a, 120-3b extending into slot 120-3 such that the entrance 160 into slot 120-3 is narrower than the main portion of slot 120-3.

The engagement connection 140-3 may, thus, be slide into slot 120-3 so that lens 310 is retained in place. Lens 310 may further be retained in place by the clip 150 (shown in FIG. 1A) or screw 130 (shown in FIG. 1B), or by an adhesive, as discussed.

FIG. 4 illustrates an end view of a second exemplary embodiment of a frame and lens in accordance with the principles of the invention.

In this illustrated embodiment, the slot 120 (referred to as 120-4) within frame 102b is represented as a dovetail connection. A dovetail connection is well known as a means for achieve a tight fit between two elements. In this illustrated embodiment, the lens 410 includes a matching dovetail connection 140-4 that engages the dovetail shaped slot 120-4. The engagement connection 140-4 may be slide into slot 120-4 so that lens 410 is retained in place. Lens 410 may further be retained in place by the clip 150 (shown in FIG. 1A), screw 130 (shown in FIG. 1B), and/or an adhesive, as discussed.

As discussed with regard to the engagement means shown in FIG. 3, the entrance to the slot 120-4 is narrower than the slot 120-4

FIG. 5 illustrates an end view of a third exemplary embodiment of a frame and lens in accordance with the principles of the invention.

In this illustrated embodiment, the slot 120 (referred to as 120-5) within frame 102b is referred to as an O-ring connection. In this case, the O-ring connection is defined as being similar to the T-slot connection shown in FIG. 3, wherein protrusions extend from a lower edge of the forward and rear section of the slot. The O-ring connection, similar to the connections shown in FIG. 3 and FIG. 4 allows the lens 510 to slide into slot 120-5 to retain lens 510 into frame 102b. The O-ring connection is advantageous as, like its name implies, it has substantially rounded edges, which reduces stress points on the frame 102 and/or the lens 510. Lens 510 may further be retained in place by the clip 150 (shown in FIG. 1A), a screw 130 (shown in FIG. 1B), and/or an adhesive, as previously discussed.

As is shown in FIGS. 3-5 a characteristic of the illustrated slots is that a width of corresponding slot at its lower edge (i.e., an entrance) represents the smallest width of the slot. The width of the slot at its lower is narrowed by, in the case of FIGS. 3 and 5, protrusions extending inward from the lower edge of the slot. In the case of FIG. 4, the width of the slot at its lower edge is narrowed by the triangular shape of the dovetail.

Although, FIGS. 3-5 illustrate a slot 120 that is internal within frame 102 and an engagement means 140 extending (projecting) from lens 110 wherein the engagement means is inserted into slot 120, it would be recognized that the engagement means 140 may be incorporated into the frame 102 and the slot 120 may be incorporated into lens 110 without altering the scope of the invention. Rather such a configuration has been contemplated and considered to be within the scope of the invention claimed.

FIG. 6 illustrates an exemplary example of a dovetail connection 640 in accordance with the principles of the invention.

In this exemplary example, the dovetail engagement means 640, similar to dovetail 140-4 shown in FIG. 4, has a first facet 640a machined or formed at substantially an angle of 108 degrees with respect to a horizontal edge that is substantially parallel to a top edge 640c of the lens 610. Further shown, is a rear facet 640b machined or formed at substantially an angle of 94 degrees with respect to the horizontal edge. The different angles for the front and rear facets are exemplary angles and are only used for the purpose of illustrating the dovetail connection in further detail. It would be appreciated that the front facet and rear facet angles may be the same or may be different. The difference in the formation of the front and rear facets may, for example, be determined based on the type, and angle, of frame 102 in which the slot 120 is formed.

Figure 7:
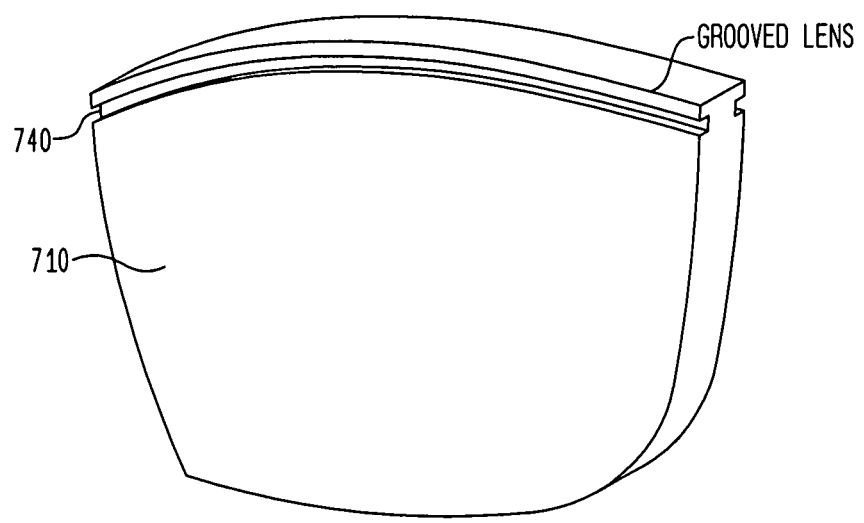
FIG. 7 illustrates a perspective view of a lens configuration in accordance with another aspect of the invention.

FIG. 7 illustrates a prospective view of an exemplary lens in accordance with another aspect of the invention.

Figure 8:
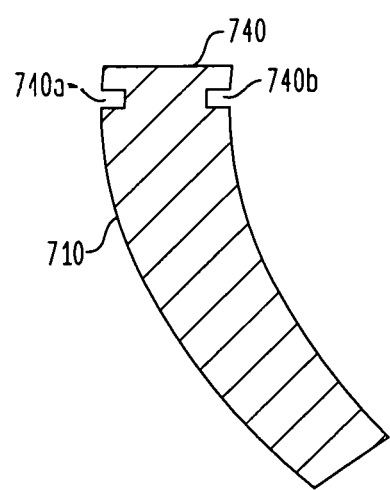
FIG. 8 illustrates a cross-sectional view of the lens shown in FIG. 7.

In this illustrated aspect, a groove 740 may be machined or formed in one of a front side and a rear side of the lens 710. In this illustrated case, the groove 740 may be squared or rounded. When the groove 740 is squared, then the incorporation of the groove 740 on both a front side and a rear side of the lens, may form a T-slot connection, similar to that should in FIG. 3 and in FIG. 8. When the groove 740 is rounded and the incorporation of the rounded groove 740 is on both the front side and the rear side of the lens, a O-ring connection, similar to that should in FIG. 5 may be formed.

The use of groove in forming or machining the engagement means 140-3/140-5 may be advantageous over forming the T-slot 140-3 or the O-ring 140-5 using a single machining tool. In the latter case, a top edge of the lens may be routed (machined) to form a T-slot, for example, in a single pass, whereas in the former case two passes of a same tool may be used to form a groove in the front and the rear side of the lens, respectively.

Figure 9A:
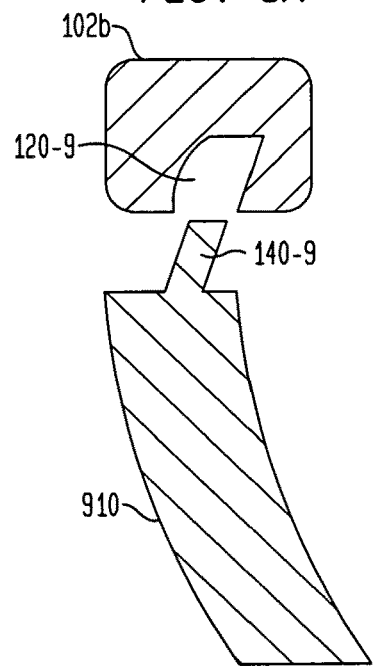
FIGS. 9A and 9B illustrate cross-sectional views of an exemplary eyewear configuration having a snap-fit connection in accordance with the principles of the invention.
Figure 9B:
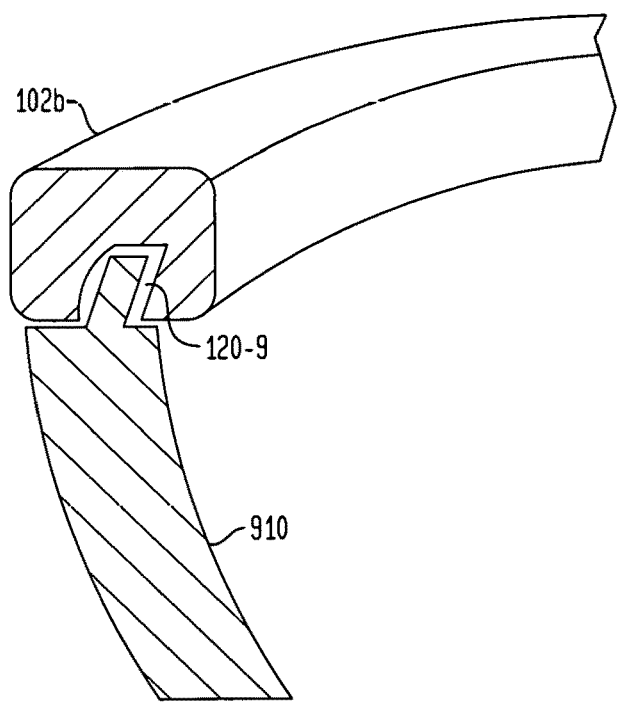

FIGS. 9A and 9B illustrate side views of another aspect of the invention, wherein an engagement element 140-9 of lens 910 has a snap-fit or snap-in connection to slot 120-9. Generally, in a snap-fit connection the engagement element 140-9 is forced into slot 120-9, such that engagement element 140-9 is held in place by friction. Alternatively, an adhesive or other bonding material may be used to retain the lens 910 in slot 120-9. As previously discussed, the adhesive may be a liquid or a heat sensitive polymer that is soft and malleable when heated and rigid when cooled.

As would be appreciated, when an adhesive is used to retain the lens 910 in slot 120-9, the size of slot 120-9 may be slight larger to allow the engagement means 140-9 to be slid into slot 120-9 easier.

In another aspect of the invention, a rubber or similar malleable material may be incorporated into slot 120-9 (or the other slots disclosed) to allow engagement means 140-9 to easily be slid into slot 120-9. An adhesive may then be used to attach the engagement means 140-9 to the incorporated rubber or similar material.

FIG. 10 illustrates a cross-sectional view of still another exemplary embodiment of the invention.

In this illustrated embodiment, a groove 1040, similar to groove 740, may be machined and/or formed in one side of lens 1010. In this illustrated example, the groove 1040 is formed on a front surface of lens 1010. The groove 1040 may engage a protrusion 1045 (i.e., a tongue) extending from a corresponding lower end of frame 102 (in this case right side of frame 102*b*). The protrusion 1045 is similar to the protrusions shown in FIG. 3 and FIG. 5. In this illustrated example, the protrusion 1045 is similar to the protrusion shown in FIG. 5, wherein the protrusion 1045 and groove 1040 have matching rounded edges. As previously discussed, rounded edges are useful in reducing stress points that may occur in the frame 102 and/or the lens 1010.

In this illustrated case, the entrance to slot 102-10 is narrower than that of slot 102-10 by protrusion 1045 extending from a lower edge into slot 102-10. Hence, the width of the slot at its the lower edge is less than a width of the slot, as previously discussed.

Further shown is a rear surface 1050 of lens 1010 that is substantially flat. Similarly, a rear inner surface 1030 of slot 102-10 within frame 102*b* is correspondingly flat. In this illustrated case, as the groove 1040 of lens 1010 is inserted into slot 120-10 to engage protrusion 1045, the rear surface 1050 of lens 1010 may be positioned along interior surface 1030 of slot 120-10. The position of rear surface 1050 with respect to internal surface 1030 may be set such that a desired angle of lens 1010 with respect to frame 102 may be achieved. That is, lens 1010 may essentially pivoted about protrusion 1045 such that the rear surface 1050 may contact surface 1030 at one of a plurality of points.

After a desired angle of lens 1010 with respect to frame 102 (e.g., section 102*b*) is achieved, lens 1010 may be fixed or retained in place within slot 120-10 by an adhesive, for example, or other similar retaining medium. Similarly, and as previously discussed, the space 1060 within slot 120-10 may be filed with a polymer material, which is malleable when heated and becomes rigid when cooled. The polymer material may fill the space 1055 between rear surface 1050 and surface 1030 (and any unoccupied space within slot 120-10). The polymer material, when cooled, may provide stability and adhesion of the lens 1010 with frame 102 (right section 102*b*).

Although not drawn to scale, a space 1060 within slot 120-10 may be filed with an insert material, such as rubber or a malleable (e.g., a polymer). In one aspect of the invention, a rubber or a malleable material may be sprayed, for example into slot 120-10 (or any of the slots previously discussed) to provide a layer (a lining) 1070 of flexible material that lines the inner surface of slot 120-10 (or any of the slots previously discussed). The lining material is advantageous as to compensate for tolerance errors caused during manufacturing process of the frame and/or the lens, to reduce stress between the lens 1010 and the frame 102 (102*b*), to allow the lens 1010 to slide within slot 120-10 and to provide an adhesive layer that retains lens 1010 within slot 120-10.

Figure 10A:
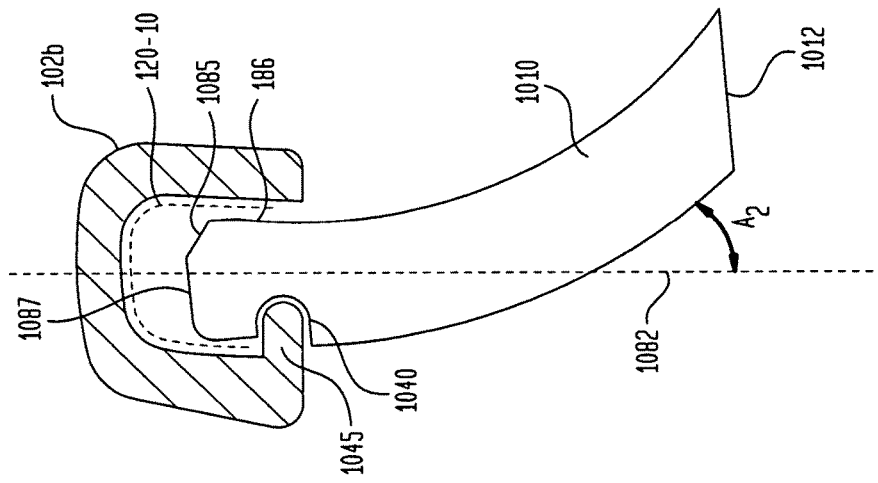
FIGS. 10A and 10B illustrates cross-sectional views of the exemplary eyewear configuration shown in FIG. 10.
Figure 10B:
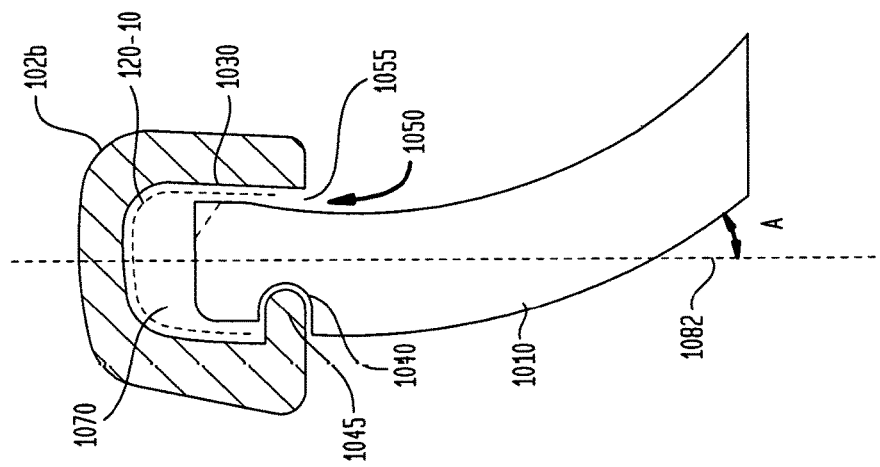

FIGS. 10A and 10B illustrate cross-sectional views of the exemplary embodiment of the invention shown in FIG. 10.

FIG. 10A illustrates a first example, wherein lens 1010 is inserted into slot 120-10 within frame right section 102*b* such that the lens 1010 forms an angle, A, with respect to frame 102, as represented by axis 1082.

FIG. 10B illustrates a second example, wherein lens 1010 is inserted into slot 120-10 within frame section 102*b* such that lens 1010 forms an angle, $A_2$, with respect to axis 1082. Angle A2 represents an incremental increase in angle A caused by the rear surface 1050 of lens 1010 being positioned further within slot 120-10 than in FIG. 10A.

The ability to alter the angle of the lens 1010 with respect to frame 102 is advantageous as a lower edge 1012 of lens 1010 may be brought closer to a user's face, which prevents the user from viewing the lower edge 1012 of the lens. As shown, an upper edge of a rear surface 1030 of lens 1010 may include a chamfer 1085, which removes the generally right angle corner between the rear surface 1030 of lens 1010 and the upper edge 1087 of lens 1010. The addition of the chamfer 1085 enables the rear surface 1050 of lens 1010 to be positioned higher along the interior surface 1030 within slot 102-10. In another aspect, the interior surface of 1030 may similarly be chamfered, 1086, to allow lens 1010 to move backward as lens 1010 is positioned higher along interior surface 1030. An adhesive may be included within a space between rear surface 1030 and interior surface 1050 to retain the lens in place.

Figure 11:
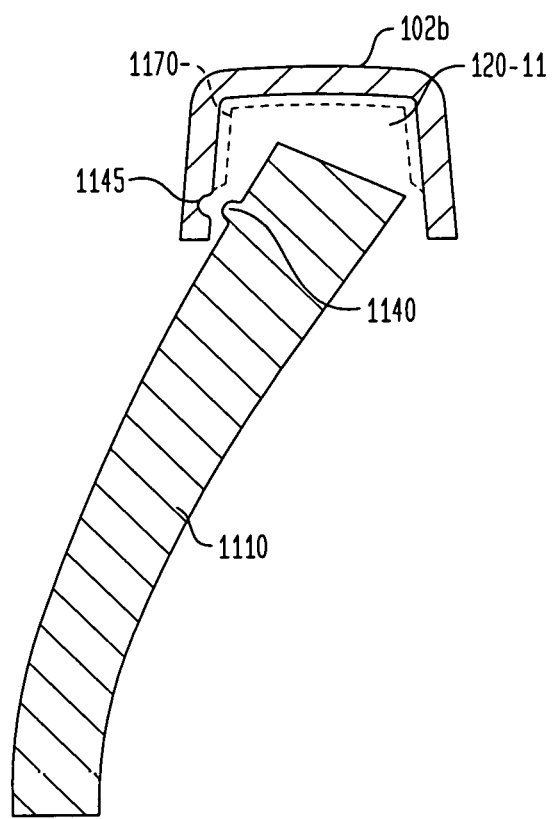
FIG. 11 illustrates a cross-sectional view of an exemplary eyewear configuration having a tongue/groove connection in accordance with the principles of the invention.

FIG. 11 illustrates a cross-sectional view of another aspect of a tongue/groove eyewear configuration in accordance with the principles of the invention.

In this illustrated embodiment frame 102 (section 102*b*) and lens 1110 are similar to corresponding elements discussed previously.

Further illustrated is a groove 1145 formed in a first surface (e.g., a front internal surface) of slot 102*b* and a matching protrusion (i.e., tongue) 1140 on lens 1110. The protrusion 1140 on lens 1110 may be formed by applying a material (e.g., a silicon) that hardens when dry. Or the tongue may be formed within the glass and/or plastic from which the lens 1110 is formed.

Lens 1110 may be positioned within slot 120-11 by sliding protrusion 1140 along groove 1145. Alternatively, and as illustrated, lens 1110 may be positioned to have tongue 1140 engage groove 1145 and then tilted upward so that a rear surface of lens 1110 may engage a second internal surface of slot 120-11. As discussed with regard to FIG. 10, lens 1110 may be retained in a desired angular orientation with respect to frame 102 by applying an adhesive to the rear surface of lens 1110. Furthermore an insert material, illustrated as a lining 1170 may be formed on the inner surfaces of slot 120-11 to fill regions between lens 1110 and slot 120-11.

Figure 12:
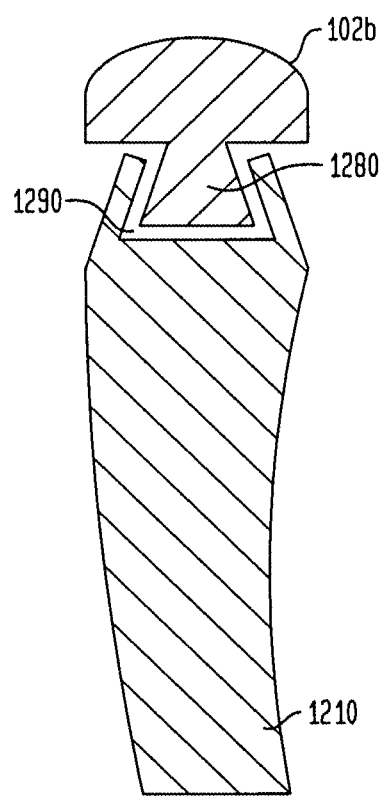
FIG. 12 illustrates a cross-sectional view of an exemplary eyewear configuration in accordance with another embodiment of the invention.

FIG. 12 illustrates a cross-section view of another exemplary embodiment of the invention, wherein the insertable engagement means 1280 is incorporated in the frame 102 (right section 102b) and the slot is formed in lens 1210.

In this illustrates embodiment, the engagement means 1280 and the slot 1290 are similar to previously discussed engagement means and slots. In this case, the slot 1290 is slide along the engagement means 1280. As previously discussed, an adhesive may be used to retain the lens in position with the frame. Or a heat sensitive polymer may be included within the slot, wherein the polymer is malleable when heated and rigid when cooled.

Figure 13:
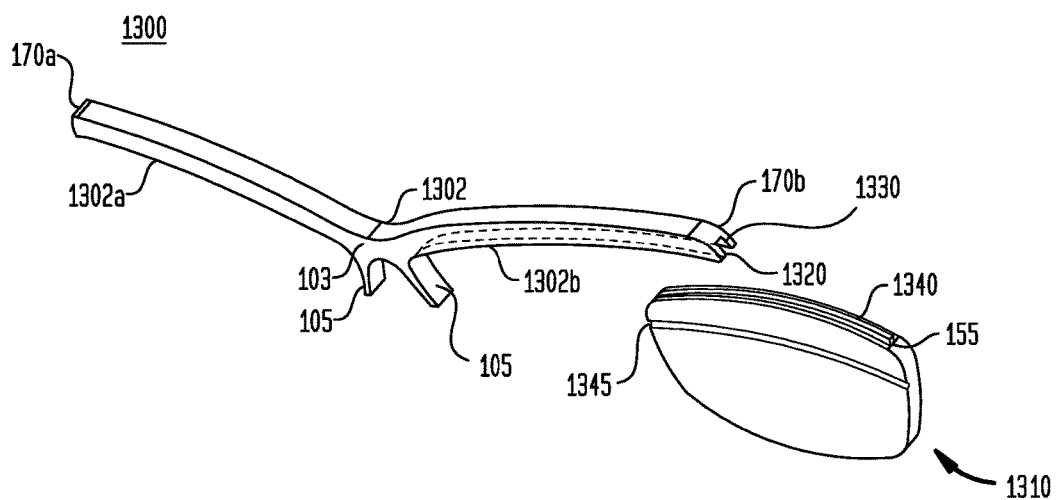
FIG. 13 illustrates a perspective, exploded, view of rimless eyewear in accordance with the principles of the invention.

FIG. 13 illustrates a prospective view of an eyewear 1300 in accordance with a second embodiment of the invention and similar to the eyewear shown in FIG. 1. Thus, similar elements are identified with similar reference number.

In this illustrated embodiment of the invention, eyewear 1300 comprises a frame 1302, composed of a left side 1302a and a right side 1302b, joined together by a bridge element 103. Although not shown it would be known in the art that the eyewear generally includes temples (i.e., a term of art) that extend from the frame 1302 to engage a user's ears so as to retain the eyewear 1300 on the user. It would be recognized that the materials utilized for frame construction may be of a plastic, a composite material, a metal material and/or combinations of these materials. The composition of the plastic and/or composites and/or metals utilized for frame construction is similarly well-known in the art and need not be discussed in detail herein.

Further shown is slot or channel 1320 shown at an end of the right side 1302b, which extends from the illustrated open end of right side 1302b toward bridge element 103 (or nose piece 105). A similar slot (not shown) is incorporated into left side 1302a. Further illustrated is a second slot or second channel 1330, positioned above slot 1320, also extends from the illustrated open end of right side 1302b to toward bridge element 103 (or nose piece 105.

Further shown is lens 1310 situated to engage the right side 1302b of frame 1302. Although only a single lens is shown, it would be recognized that the eyewear 1300 is composed of two lenses. It would be further recognized that the lens may be constructed from a plastic material and/or a glass material. The composition of the plastics and/or glass material for the construction of the lens 110 is well-known in the art and need not be discussed in detail herein. In one aspect the lenses 1310 may be constructed to have a fixed magnification (i.e., reading glasses with magnifications such as 1.25, 1.5, 1.75 etc.). Alternatively, the lens may be medically required, prescriptive, lens, which are custom manufactured for a client.

Further shown is an extension or engagement means or ridge 1340 along a top edge of the lens 1310. Engagement means 1340 engages second slot 1330 to retain lens 1310 to frame 1302, as will be discussed. In the exemplary embodiment illustrated, the engagement means 1340 is represented as a ridge extending along an upper edge of lens 1310.

Further illustrated is groove 1345 formed on a front surface of lens 1010. Groove 1345 is similar to groove 1040 shown in FIG. 10, for example. Groove 1345, similar to groove 1040, may engage a retaining means (not shown) positioned along a corresponding lower end of frame 1302 (in this illustrated example, right side of frame 1302b).

Figure 14A:
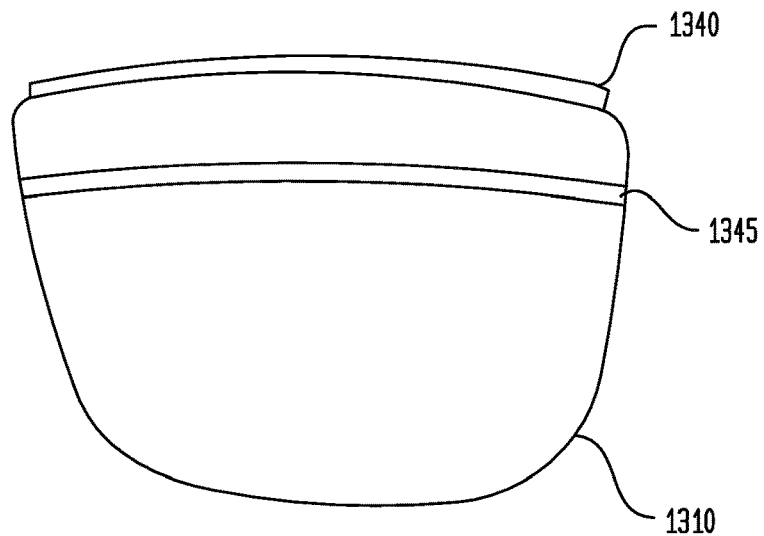
FIGS. 14A and 14B illustrate an exemplary front view and an exemplary side view, respectively, of a lens formed in accordance with the principles of the invention.
Figure 14B:
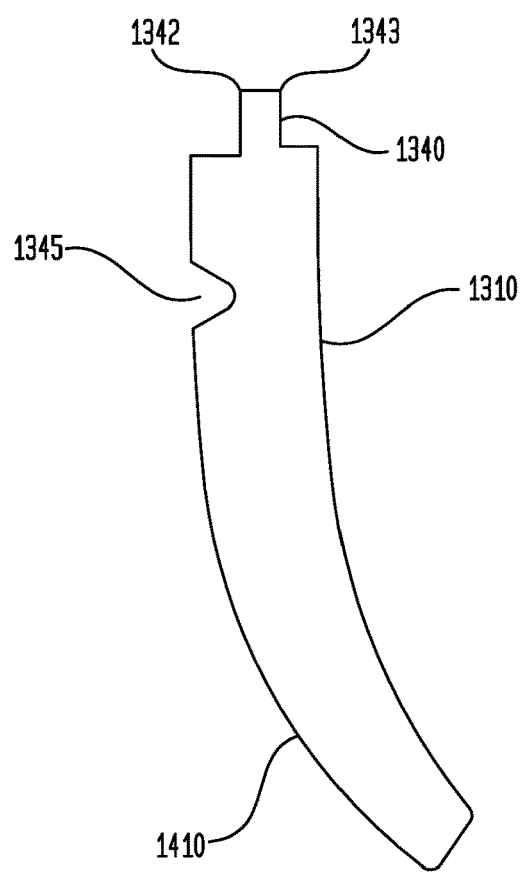

FIG. 14A illustrates a front view of an exemplary lens 1310 including groove 1345 etched or machined into a front surface of lens 1310 and engagement means 1340 positioned along a top surface of lens 1310. FIG. 14B illustrates a side view of the exemplary lens 1310 shown in FIG. 14B.

In this illustrated embodiment, engagement means 1340 extends substantially perpendicular to a top surface of lens 1310. Engagement means 1340, hereinafter referred to as "step-bevel" may be constructed, for example, by machining (i.e. removing material from lens 1340). Similarly, step-bevel 1340 may be constructed by molding lens 1310 to include this element.

Further illustrated is groove 1345, which may be machined into a front surface 1410 of lens 1310. Groove 1345 may, similar to the step-bevel 1340, may be machined by, for example, routing front surface 1410 or may be molded into lens 1310. It would be recognized that the shape of groove 1345 may be determined, for example, by the cutting pattern of a router bit selected to machine groove 1345. Preferably, groove 1345 is rounded to avoid stresses on the lens 1310. Similarly, edges 1342, 1343 may be rounded to avoid stress related issues.

Figure 15:
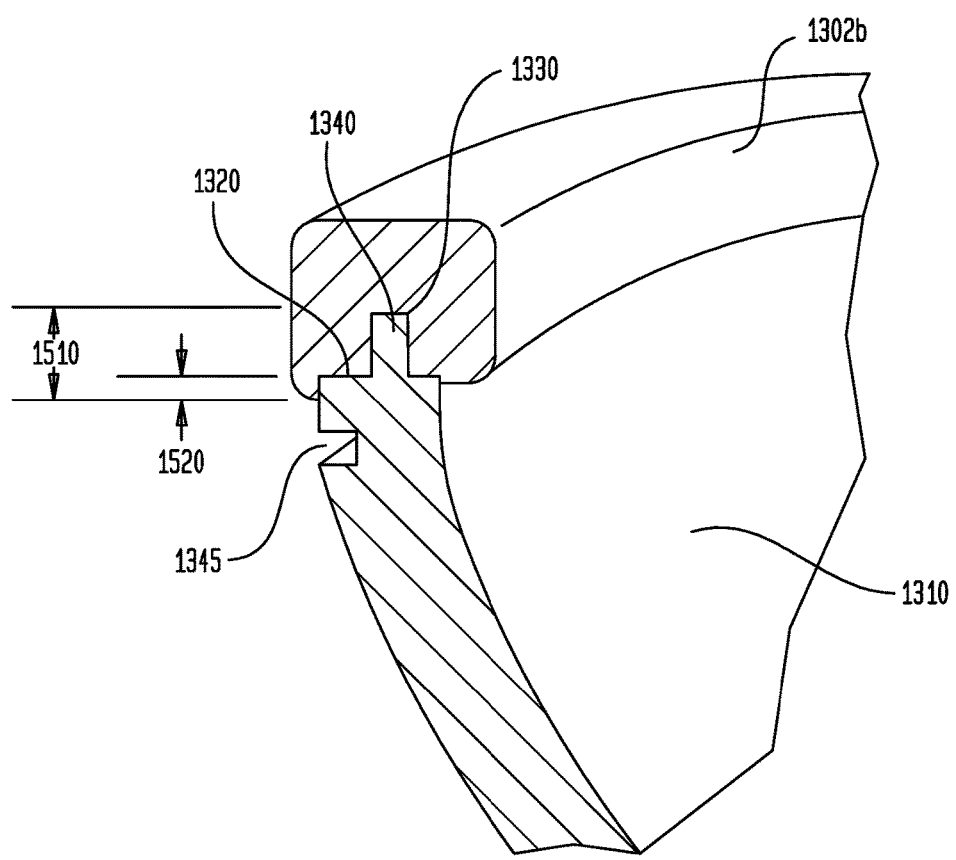
FIG. 15 illustrates a side view of an exemplary lens configuration in accordance with the principles of the invention.

FIG. 15 illustrates a side view of exemplary frame 1302 and lens 1310 in accordance with the principles of the invention.

In this illustrated exemplary embodiment of the invention, step-bevel 1340 is positioned within second slot 1330 of slot 1320 such that an upper edge of lens 1310 substantially engages slot 1320 on both sides of frame 1302b. Further illustrated is groove 1345, which in this illustrated embodiment is shown below a lower edge of frame 102.

Further illustrated, is the relationship between first channel 1320 and second channel 1330. As illustrated first channel 1320 extends into frame section 1302b, as measured from a lower edge of frame section 1302b, a distance, d1, 1520, whereas second channel 1330 extends into frame section 1302b, as measured from a lower edge of frame section 1302b, a distance, d2, 1530. As illustrate d1 is less than d2. Additionally, if would be understood that the distance, d1, 1520 may be a zero (0) value. That is the first channel 1320 represents a bottom surface of frame section 1302b. Thus, in the context of the instant disclose the term first channel may represent as a channel having a distance, measured from a lower edge of frame section 1302b, of zero to less than d2. Further illustrated is a width of first channel 1320 being greater than a width of second channel 1330. See, for example, FIG. 9B.

Further illustrated is the height or dimension of engagement means 1340 is comparable to the distance measure 1510 of the second slot or channel 1330.

Furthermore and returning to FIGS. 10, 10A, 10B and/or 11, it would be recognized that groove 1345 may engage a protrusion incorporated into frame 1302 (illustrated section 1302b) such that lens 1310 may concurrently engage second slot 1330 and protrusion 1345 (see FIG. 10), for example).

Figure 16:
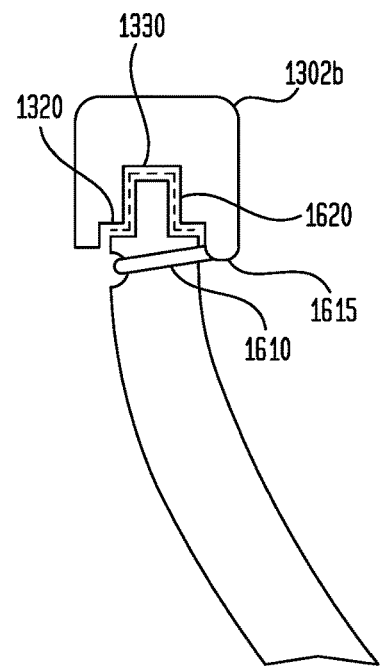
FIG. 16 illustrates a prospective view of a rimless eyewear in accordance with the principles of the invention.

FIG. 16 illustrates an exemplary embodiment of a rimless eyewear according to a second aspect, wherein the step-bevel 1340 of lens 1310 is inserted into a corresponding second slot 1330 in frame 1302 (e.g., 1302b) and a retainer 1610 engages groove 1345 to retain lens 1310 in place. In an exemplary embodiment retainer 1610 is a flexible strip extending from an open end of slot 1302b to substantially nose piece 105 or bridge section 103. In one aspect of the invention retainer 1610 may be constructed of a stretchable material, such as nylon. Retainer 1610, in the form of a nylon strip, may be tightly held between substantially nose piece 105 or bridge section 103 and an open end of slot 1302b to apply force to groove 1345 of lens 1310 when lens 1310 is inserted into frame section 1302b. As illustrated the flexible material 1610 may be attached to an anchor point 1615 on a rear surface of frame section 1302b such that the flexible material 1610 extends across the outer edges of a corresponding lens. In the illustrated embodiment, attachment point 1615 is shown on the open end of frame section 1302b while it be recognized that a second attachment point (not shown) may be at the bridge section 103 or the nose portion 105. Thus, the lens 1310 is held in place by the nylon strip 1610 being stretched to cause the lens 1310 to be positioned within frame section 1302b between the nylon retainer 1610 and the rear surface of frame section 1302b.

Further illustrated is a lining element 1620, similar to that shown in FIG. 11, for example, may be included within at least one of first slot 13320 and second slot 1330. The lining element, which made of a flexible or malleable (i.e., soft, pliable, adaptable) material, such as rubber, neoprene and/or silicon, may provide for a cushioning between frame section 1302b and corresponding lens 1310.

Figure 17:
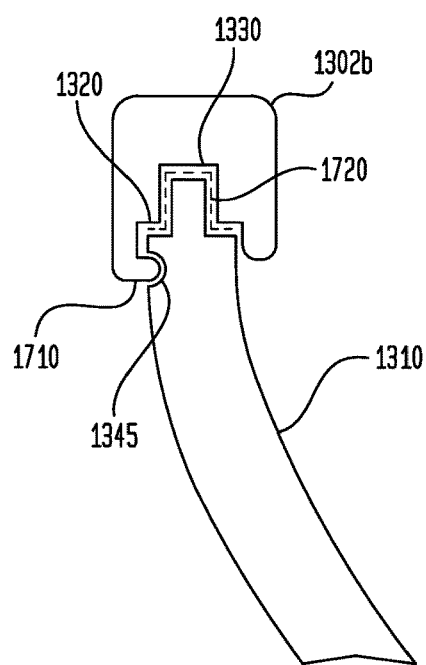
FIG. 17 illustrates a side view of a rimless eyewear in accordance with the principles of the invention.

FIG. 17 illustrates a side view of an exemplary embodiment of a rimless eyewear according to another aspect of the invention, wherein the step-bevel of lens 1310 is inserted into a corresponding second slot 1330 in frame 1320 (e.g., 1302b) and a retainer 1710, in the form of a dimple or protrusion extending toward first slot 1320 on a lower edge of frame section 1302b. Retainer 1710 engages groove 1345 to retain lens 1310 in place. In an exemplary embodiment, retainer 1710 is molded in frame section 1302b, such that retainer 1710 extends from an open end of slot 1302b to substantially nose piece 105 or bridge section 103.

Further illustrated is a lining element 1720 that may be included within at least one of the first slot 1320 and the second slot 1330. The lining element, which made of a flexible or malleable (i.e., soft, pliable, adaptable) material, such as rubber, neoprene and/or silicon, may provide for a cushioning between frame section 1302b and corresponding lens 1310.

To summarize the principles of the invention, the invention describe herein is an eyewear comprising a frame comprising a first section and a second section joined together by a bridge element, the bridge element including a nose element extending downward therefrom, each of the first section and the second section including a slot therein, wherein a width of an entrance to the slot is narrower than a width of the slot; and a lens associated with each of the first section and the second section, each lens comprising a main portion and a deformation of the main portion along an upper section of the main portion, wherein the deformation decreases a width of the main portion, the decrease in width being comparable to the width of the slot entrance. Furthermore, the width of the slot is narrowed by at least one protrusion extending from a corresponding lower edge of the frame, wherein the at least one protrusion is one of: a square protrusion, a triangular protrusion and a rounded protrusion.

In accordance with the principles of the invention, an upper edge of each lens includes a chamfer and a lower edge of the first section and the second section of the frame may similarly include a chamfer. The eyewear disclosed may further include an insert material within a slot within each of the first section and the second section, wherein the insert material is one of: a rubber, a silicon, neoprene and a malleable material. The eyewear may further include a retaining element configured to retain the lens within a corresponding slot, the retaining element may be one of the insert material, an adhesive, a clip, a screw and a heat sensitive polymer.

To summarize invention a first aspect of the invention described herein is an eyewear comprising a frame comprising a first section and a second section joined together by a bridge element, the bridge element including a nose element extending downward therefrom, each of the first section and the second section including a first slot and a second slot therein, wherein the second slot has a depth into the corresponding frame section greater than the depth of the first slot. Furthermore, a lens associated with each of the first section and the second section comprises a main portion, including a ridge along the top edge of the main portion and a deformation of the main portion along an upper section of the main portion, wherein the deformation decreases a width of the main portion. In one aspect of the invention a width of the first slot is narrowed by at least one protrusion extending from a corresponding lower edge of the frame, wherein the at least one protrusion is one of: a square protrusion, a triangular protrusion and a rounded protrusion. In accordance with the principles of the invention, the ridge along a top edge of the main portion of the lens is insertable into the second slot, while the groove in a surface of the lens engages a corresponding protrusion in the lower edge of the frame. The eyewear disclosed may further include an insert or lining material within at least one of the first slot and the second slot within each of the first section and the second section, wherein the insert material is one of: a rubber, a silicon, neoprene, pliable and a malleable material.

To summarize a second aspect of the invention described herein is an eyewear comprising a frame comprising a first section and a second section joined together by a bridge element, the bridge element including a nose element extending downward therefrom, each of the first section and the second section including a first slot and a second slot therein, wherein the second slot has a depth into the corresponding frame section greater than the depth of the first slot. Furthermore, a lens associated with each of the first section and the second section comprises a main portion, including a ridge along the top edge of the main portion and a deformation of the main portion along an upper section of the main portion, wherein the deformation decreases a width of the main portion. In one aspect of the invention a flexible material, such a nylon, is stretched between an open end of the frame section and either the bridge second or a nose piece. In accordance with the principles of the invention, the ridge along a top edge of the main portion of the lens is insertable into the second slot, while the groove in a surface of the lens engages the flexible material is stretched such that the flexible material engages the groove. The eyewear disclosed may further include an insert or lining material within at least one of the first slot and the second slot within each of the first section and the second section, wherein the insert material is one of: a rubber, a silicon, neoprene, pliable and a malleable material.

Although the invention has been described with regard to preferred embodiments of the invention claimed, it is expressly intended that all combinations of those elements that perform substantially the same function in substantially the same way to achieve the same results are within the scope of the invention. Substitutions of elements from one described embodiment to another are also fully intended and contemplated.

The terms "a" or "an" as used herein are to describe elements and components of the invention. This is done merely for convenience and to give a general sense of the invention. The description herein should be read to include one or at least one and the singular also includes the plural unless indicated to the contrary.

The term "comprises", "comprising", "includes", "including", "as", "having", or any other variation thereof, are intended to cover non-exclusive inclusions. For example, a process, method, article or apparatus that comprises a list of elements is not necessarily limited to only those elements but may include other elements not expressly listed or inherent to such process, method, article, or apparatus. In addition, unless expressly stated to the contrary, the term "or" refers to an inclusive "or" and not to an exclusive "or". For example, a condition A or B is satisfied by any one of the following: A is true (or present) and B is false (or not present); A is false (or not present) and B is true (or present); and both A and B are true (or present).

What is claimed is:

1. A rimless eyewear comprising:
   a frame section comprising:
      a bridge section;
      a left section; and
      a right section, wherein the left section and the right section are oppositely attached to said bridge section, each of the left section and the right section comprising a slot formed therein, each of said slot comprising:
         a first slot extending from substantially a free end of a corresponding section to substantially the bridge section; and
         a second slot, substantially centered within the first slot, wherein a width of said second slot being less than said first slot; and
         a retainer positioned along a lower edge of the first corresponding section;
   a first lens configured to attach to the left section; and
   a second lens configured to attach to the right section, each of the first lens and the second lens comprising:
      an engagement means formed along an upper edge, said engagement means configured to engage a corresponding second slot; and
      a groove in a surface, wherein the retainer is configured to engage the groove.

2. The eyewear of claim 1, further comprising a pliable lining element within at least one of: the first slot and the second slot.

3. The eyewear of claim 2, wherein the lining element is one of: a rubber material, a neoprene material, and a silicon material.

4. The eyewear of claim 1, wherein the retainer is a protrusion extending from a lower edge of a corresponding left section and right section inward towards the first slot.

5. The eyewear of claim 1, wherein the retainer is a flexible material extending from a first end of the first slot to a second end of the first slot.

6. The eyewear of claim 5, wherein the flexible material is a nylon strip.

7. The eyewear of claim 1, wherein the second slot extends a greater distance into a corresponding left section and right section than a distance said first slot extends in a corresponding left section and right section.

8. The eyewear of claim 7, wherein the distance of said first distance is in a range of 0 to less than the distance of the second slot.

9. The eyewear of claim 1, wherein the engagement means comprises a ridge.

10. An eyewear configuration comprising:
    a frame comprising:
       a first section and a second section joined together by a bridge element, the bridge element including a nose element extending downward therefrom, each of the first section and the second section comprising:
          a first slot extending a first distance into the section; and
          a second slot, said second slot within the first slot, said second slot extending a second distance into the section, said second distance being greater than the first distance;
          a retainer extending substantially a length of a corresponding one of the first section and the second section; and
    a lens associated with each of the first section and the second section, each lens comprising:
       a main portion; and
       a ridge along an upper edge of the main portion, wherein a height of said ridge being substantially similar to the second distance; and
       a groove along a surface of the main portion, wherein said ridge is configured to engage the second slot and the retainer is configured to engage the groove.

11. The eyewear of claim 10, wherein the retainer is a stretchable material attached at each of a first end and a second end of a corresponding one of the first section and the second section.

12. The eyewear of claim 11, wherein the material comprises a nylon material.

13. The eyewear of claim 10, further comprising:
    a lining material contacting at least one inner surface of at least one of: the first slot and the second slot.

14. The eyewear of claim 13, wherein the lining material is a pliable material.

15. The eyewear of claim 10, wherein the retainer is a protrusion extending from a lower edge of a corresponding one of the first section and the second section toward the first slot.

* * * * *

UNITED STATES PATENT AND TRADEMARK OFFICE
CERTIFICATE OF CORRECTION

Page 1 of 2

PATENT NO. : 10,254,561 B1
APPLICATION NO. : 16/026004
DATED : April 9, 2019
INVENTOR(S) : J. Santinelli It is certified that error appears in the above-identified patent and that said Letters Patent is hereby corrected as shown below:

In the Specification

Column 1, Line 8 after "which" insert therefor --claimed--
Column 2, Line 1 after "connector" insert therefor --that--
Column 3, Line 62 after "of" insert therefor --a--
Column 4, Line 4 delete "prospective" insert therefor --side--
Column 5, Line 40 delete "that that" insert therefor --that--
Column 6, Line 36 after "lower" insert therefor --edge--
Column 7, Line 11 after "lens" insert therefor --710--
Column 7, Line 34 delete "easier" insert therefor --easily--
Column 9, Line 52 delete "extends" insert therefor --extending--
Column 10, Line 8 delete "1010" insert therefor --1310--
Column 10, Line 50 delete "1530" insert therefor --1510--
Column 10, Line 50 after "d1" insert therefor --1520--
Column 10, Line 51 after "d2" insert therefor --1510--
Column 10, Line 51 delete "if" insert therefor --it--
Column 10, Line 53 delete "represents" insert therefor --may represent--
Column 10, Line 54 delete "disclose" insert therefor --disclosure--
Column 11, Line 20 after "it" insert --would--
Column 11, Line 28 delete "13320" insert therefor --1320--
Column 11, Line 29 after "element" insert --1620--
Column 12, Line 42 delete "is" insert therefor --comprises--

In the Claims

Column 13, Line 43 delete "the first corresponding section" insert therefor --a corresponding one of the left section and the right section--
Column 13, Line 50 after "a" insert --front--

Signed and Sealed this
Twenty-fifth Day of June, 2019

Andrei Iancu
*Director of the United States Patent and Trademark Office*

CERTIFICATE OF CORRECTION (continued)
U.S. Pat. No. 10,254,561 B1

Column 14, Line 2 after "extending" insert therefor --inward towards the first slot--
Column 14, Line 3 delete "left section and" insert therefor --one of the left section and the--
Column 14, Line 3 delete "inward towards the first slot"
Column 14, Line 6 after "slot" insert therefor --of each of the first section and the second section--
Column 14, Line 11 delete "in a"
Column 14, Line 12 prior to "corresponding" insert therefor --into the--
Column 14, Line 14 delete "first"
Column 14, Line 14 after "distance" insert therefor --of said first slot--
Column 14, Line 25 delete "the" insert therefor --a corresponding one of the first section and the second--
Column 14, Line 26 after "said second slot" insert therefor --being--
Column 14, Line 27 delete "the"
Column 14, Line 28 prior to "section" insert therefor --a corresponding one of the first section and the second--
Column 14, Line 37 delete "being" insert therefor --is--
Column 14, Line 38 after "distance" insert therefor --of the corresponding one of the first section and the second section--